United States Patent
Fan (10) Patent No.: US 10,915,200 B2
(45) Date of Patent: Feb. 9, 2021

(54) TOUCH AND DISPLAY DRIVER, DRIVING METHOD, HOST AND TOUCH DISPLAY APPARATUS

(71) Applicants: Beijing BOE Optoelectronics Technology Co., Ltd., Beijing (CN); BOE Technology Group Co., Ltd., Beijing (CN)

(72) Inventor: Litao Fan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 44 days.

(21) Appl. No.: 16/332,569

(22) PCT Filed: Sep. 14, 2018

(86) PCT No.: PCT/CN2018/105677
§ 371 (c)(1),
(2) Date: Mar. 12, 2019

(87) PCT Pub. No.: WO2019/134393
PCT Pub. Date: Jul. 11, 2019

(65) Prior Publication Data
US 2020/0174614 A1 Jun. 4, 2020

(30) Foreign Application Priority Data
Jan. 2, 2018 (CN) .......................... 2018 1 0002101

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC .. G06F 3/0416; G06F 3/0412; G06F 13/4068; G06F 3/1446; G09G 3/3611;
(Continued)

(56) References Cited

U.S. PATENT DOCUMENTS 9,430,076 B2 8/2016 Chen et al.
10,096,303 B2 10/2018 Lee et al.
(Continued)

FOREIGN PATENT DOCUMENTS

CN 1450520 A 10/2003
CN 1897099 A 1/2007
(Continued)

OTHER PUBLICATIONS

International Search Report and Written Opinion, including English translation of the search report and Box V of the Written Opinion, for International Application No. PCT/CN2018/105677 dated Sep. 14, 2018, 13 pages.
(Continued)

*Primary Examiner* — Stacy Khoo
(74) *Attorney, Agent, or Firm* — Westman, Champlin & Koehler, P.A.

(57) ABSTRACT

The present disclosure proposes a touch and display driver, a driving method, a host, and a touch display apparatus, wherein the touch and display driver includes a communication interface configured to be communicatively connected to a host to acquire a driver file; and a controller configured to drive a touch component and/or a display component by using the acquired driver file.

14 Claims, 6 Drawing Sheets

(58) Field of Classification Search
CPC . G09G 5/18; G09G 5/008; G06T 1/20; H04L 65/80
See application file for complete search history.

(56) References Cited

U.S. PATENT DOCUMENTS

| | | | |
|---|---|---|---|
| 2002/0067923 A1* | 6/2002 | Fujimura | H04N 1/00204 396/429 |
| 2007/0013774 A1 | 1/2007 | Maeng et al. | |
| 2007/0152058 A1* | 7/2007 | Yeakley | G06F 40/14 235/462.01 |
| 2010/0201646 A1* | 8/2010 | Sakai | G06F 3/1446 345/173 |
| 2011/0099544 A1* | 4/2011 | Haramiishi | G06F 8/654 717/168 |
| 2014/0160058 A1* | 6/2014 | Chen | G06F 3/0412 345/174 |
| 2014/0253536 A1 | 9/2014 | Honda et al. | |
| 2015/0039726 A1* | 2/2015 | Hoffert | H04N 21/42623 709/219 |
| 2015/0153803 A1 | 6/2015 | Tokutake | |
| 2015/0242049 A1* | 8/2015 | Tsukahara | G06F 3/0416 345/173 |
| 2016/0055830 A1 | 2/2016 | Lee et al. | |
| 2016/0162083 A1 | 6/2016 | Zhang | |
| 2018/0046322 A1 | 2/2018 | Li et al. | |

FOREIGN PATENT DOCUMENTS

| | | |
|---|---|---|
| CN | 101547360 A | 9/2009 |
| CN | 102929465 A | 2/2013 |
| CN | 102999216 A | 3/2013 |
| CN | 103871378 A | 6/2014 |
| CN | 104375711 A | 2/2015 |
| CN | 104699334 A | 6/2015 |
| CN | 105389144 A | 3/2016 |
| CN | 105808289 A | 7/2016 |
| CN | 106293233 A | 1/2017 |
| CN | 108089758 A | 5/2018 |
| EP | 2881845 B1 | 5/2017 |

OTHER PUBLICATIONS

First Office Action, including Search Report, for Chinese Patent Application No. 201810002101.0, dated Jan. 2, 2018, 22 pages.

* cited by examiner

Fig. 10

TOUCH AND DISPLAY DRIVER, DRIVING METHOD, HOST AND TOUCH DISPLAY APPARATUS

CROSS-REFERENCE TO RELATED APPLICATION(S)

This application claims priority to the PCT application No. PCT/CN2018/105677, filed on Sep. 14, 2018, entitled "TOUCH AND DISPLAY DRIVER, DRIVING METHOD, HOST, AND TOUCH DISPLAY APPARATUS", which claims priority to the Chinese Patent Application No. 201810002101.0, filed on Jan. 2, 2018, entitled "TOUCH AND DISPLAY DRIVER, DRIVING METHOD, HOST, AND TOUCH DISPLAY APPARATUS", which are incorporated herein by reference in their entireties.

TECHNICAL FIELD

The present disclosure relates to the field of electronic technologies, and more particularly, to a touch and display driver, a driving method, a host, and a touch display apparatus.

BACKGROUND

Currently, Touch and Display Driver Integration (TDDI for short) has advantages such as reduced display noise, saved cost, and thin appearance of an electronic device where it is located etc., thereby causing various manufacturers for liquid crystal display screens, modules, etc. to race to perform research and development.

In the related art, a Flash Memory (Flash for short) is generally added to a peripheral Flexible Printed Circuit (FPC for short) board of a display module in an electronic device to store driver data such as firmware data and configuration data etc., and when a touch component and/or a display component in the TDDI are driven, the driver data may be acquired from the Flash to drive the touch component and/or the display component. In this method for driving the TDDI, processes of mounting elements on the FPC and burning firmware of the TDDI etc. are required, which makes a process of manufacturing the FPC complicated and difficult. Further, the driver data is stored by using the Flash, which is not only costly, but also occupies a space of the FPC, and thereby is not beneficial for thinning of the electronic device.

SUMMARY

According to a first aspect of the embodiments of the present disclosure, there is proposed a touch and display driver, comprising:

a communication interface configured to be communicatively connected to a host to acquire a driver file; and a controller configured to drive a touch component and/or a display component by using the acquired driver file.

In some embodiments, the touch and display driver further comprises the touch component and/or the display component.

In some embodiments, the driver file comprises N data identifiers and N types of driver data corresponding to the N data identifiers respectively, wherein N is a positive integer greater than or equal to 1; and the controller is further configured to determine N target driver devices according to the N data identifiers, and drive the N target driver devices by using the N types of driver data respectively.

In some embodiments, the controller is further configured to transmit a driver file acquisition request to the host through the communication interface, wherein the driver file acquisition request comprises identifiers of target driver data.

In some embodiments, the driver file comprises a file header, which comprises a size of the driver file and a first check code; and the controller is further configured to, after acquiring the driver file, determine, according to the size of the driver file in the file header, whether a process of receiving the driver file ends, calculate first check data according to the acquired driver file, and determine whether the acquired driver file is accurate according to whether the first check code is consistent with the first check data.

According to a second aspect of the embodiments of the present disclosure, there is proposed a host, comprising:

a memory configured to store a driver file for driving a touch and display driver;

a communication interface configured to be communicatively connected to the touch and display driver; and a processor configured to, upon determining that the touch and display driver is powered on, read the driver file stored in the memory and transmit the driver file to the touch and display driver through the communication interface.

In some embodiments, the communication interface is further configured to acquire a driver file acquisition request transmitted by the touch and display driver, wherein the driver file acquisition request comprises identifiers of target driver data.

In some embodiments, the processor is further configured to package the driver file according to a protocol corresponding to the communication interface; and the processor is further configured to determine a file header corresponding to the driver file according to an attribute of the driver file, wherein the file header comprises a size field for identifying a size of the driver file and a check code field.

According to a third aspect of the embodiments of the present disclosure, there is proposed a touch display apparatus, comprising the touch and display driver according to the first aspect.

According to a fourth aspect of the embodiments of the present disclosure, there is proposed an electronic device, comprising the touch and display driver according to the first aspect and the host according to the second aspect.

According to a fifth aspect of the embodiments of the present disclosure, there is proposed a method for driving a touch and display driver, comprising:

acquiring a driver file from a host; and driving a touch component and/or a display component by using the driver file.

In some embodiments, the driver file comprises N data identifiers and N types of driver data corresponding to the N data identifiers respectively, wherein N is a positive integer greater than or equal to 1; and driving a touch component and/or a display component comprises:

determining N target driver devices according to the N data identifiers; and driving the N target driver devices by using the N types of driver data, respectively.

In some embodiments, before acquiring the driver file from the host, the method further comprises:

transmitting a driver file acquisition request to the host, wherein the driver file acquisition request comprises identifiers of target driver data.

In some embodiments, the driver file comprises a file header, which comprises a size of the driver file and a first check code; and after the host acquires the driver file, the method further comprises:

determining whether a process of receiving the driver file ends according to the size of the driver file in the file header;

calculating first check data according to the acquired driver file; and determining whether the acquired driver file is accurate according to whether the first check code is consistent with the first check data.

According to a sixth aspect of the embodiments of the present disclosure, there is proposed a method for driving a touch and display driver, comprising:

upon determining that the touch and display driver is powered on, acquiring a driver file for the touch and display driver; and transmitting the driver file to the touch and display driver.

In some embodiments, determining that the touch and display driver is powered on comprises:

determining that a power source connected to a power supply terminal of the touch and display driver outputs an electrical signal;

or, acquiring a driver file acquisition request transmitted by the touch and display driver.

In some embodiments, before transmitting the driver file to the touch and display driver, the method further comprises:

packaging the driver file according to a communication interface protocol for communicative connection with the touch and display driver; and before packaging the driver file, the method further comprises:

determining a file header corresponding to the driver file according to an attribute of the driver file, wherein the file header comprises a size field for identifying a size of the driver file and a check code field.

BRIEF DESCRIPTION OF THE ACCOMPANYING DRAWINGS

The above and/or additional aspects and advantages of the present disclosure will become apparent and readily understood from the following description of the embodiments in conjunction with the accompanying drawings, in which.

DETAILED DESCRIPTION

The embodiments of the present disclosure will be described in detail below. Examples of the embodiments are shown in the accompanying drawings. The same or similar reference signs indicate the same or similar elements or elements having the same or similar functions throughout the accompanying drawings. The embodiments described below with reference to the accompanying drawings are illustrative, and are intended to explain the present disclosure, but cannot be construed as limiting the present disclosure.

In the related art, a Flash is generally added to a peripheral FPC board of a display module in an electronic device to store driver data such as firmware data and configuration data etc., so that when a touch component and/or a display component in the TDDI are driven, the driver data may be acquired from the Flash. In this method for driving the TDDI, processes of mounting elements on the FPC and burning firmware of the TDDI etc. are required, which makes a process of manufacturing the FPC complicated and difficult. Further, the driver data is stored by using the Flash, which is not only costly, but also occupies a space of the FPC, and thereby is not beneficial for thinning of the electronic device. With respect to these problems, the embodiments of the present disclosure provide a touch and display driver and a host.

The touch and display driver and the host according to the embodiments of the present disclosure may be communicatively connected to each other through the communication interface, to store the driver file in the host, and then acquire the driver file from the host as needed to drive the touch component and/or the display component in the touch and display driver, which reduces the difficulty in the process of manufacturing the FPC, reduces a manufacturing cost, saves a space of the FPC, and provides conditions for the thinning of the electronic device.

The touch and display driver, the driving method, the host, and the touch display apparatus according to the embodiments of the present disclosure will be described below with reference to the accompanying drawings.

Firstly, the touch and display driver and the method for driving a touch and display driver performed on the touch and display driver side according to the embodiments of the present disclosure will be described with reference to FIGS. 1, 2 and 3.

Figure 1:
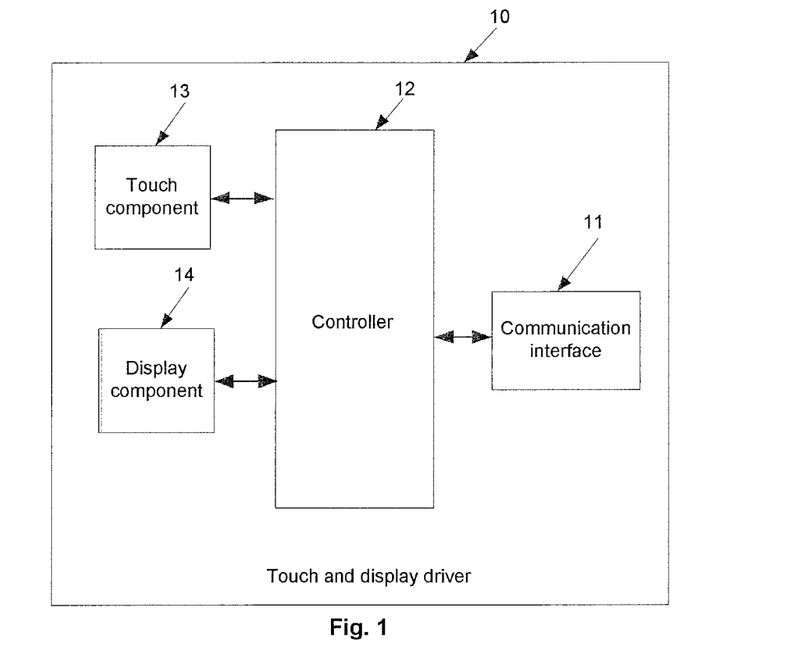
FIG. 1 is an exemplary structural diagram of a touch and display driver according to an embodiment of the present disclosure.

FIG. 1 is an exemplary structural diagram of a touch and display driver according to an embodiment of the present disclosure. FIG. 2 is an exemplary flowchart of a method for driving a touch and display driver according to an embodiment of the present disclosure. FIG. 3 is an exemplary flowchart of another method for driving a touch and display driver according to an embodiment of the present disclosure.

As shown in FIG. 1, the touch and display driver 10 comprises a communication interface 11 and a controller 12. In addition, as shown in FIG. 1, the touch and display driver 10 may further comprise a touch component 13 and/or a display component 14. It should be noted, however, that in some other embodiments, the touch and display driver 10 may not comprise any or both of the touch component 13 and/or the display component 14. For example, in a display device (for example, a monitor, a television, etc.) which does not support a touch operation, the touch and display driver 10 which does not comprise the touch component 13 may be used. In this case, the touch and display driver 10 may also be referred to as a display driver 10. As another example, in a pure touch device (for example, a touch panel, a tablet, etc.) which does not support display, the touch and display driver 10 which does not comprise the display component 14 may be used. In this case, the touch and display driver 10 may also be referred to as a touch driver 10. As another example, in a case where the touch component 13 and/or the display component 14 are externally and communicatively coupled to the touch and display driver 10, the touch and display driver 10 itself may not have the touch component 13 and/or the display component 14. In other words, the present disclosure is not limited to the specific embodiment shown in FIG. 1.

Specifically, the communication interface 11 is configured to be communicatively connected to the host to acquire a driver file.

The controller 12 is configured to drive the touch component 13 and/or the display component 14 by using the acquired driver file.

Here, the driver file may comprise any one or more of driver data such as firmware data, configuration data of the touch component 13 and/or the display component 14, power driver data of the display component, time driver data, etc.

The communication interface 11 of the touch and display driver 10 may be connected to the host through a bus, or may also be connected to the host by other means, which is not limited here.

Specifically, the driver file required to drive the touch component 13 and/or the display component 14 may be stored in the host. Thereby, when the touch component 13 and/or the display component 14 need to be driven after the touch and display driver 10 is powered on, the driver file may be acquired from the host through the communication interface 11, and the touch component 13 and/or the display component 14 may be driven by the controller 12 by using the driver file. Since the driver file is stored in the host, there is no need to add a Flash to the FPC to store the driver file. As a result, processes of performing piece positioning and burning firmware of the TDDI etc. on the FPC are not required, which reduces the difficulty in the process of manufacturing the FPC, reduces a manufacturing cost, saves a space of the FPC, and provides conditions for the thinning of the electronic device.

Figure 2:
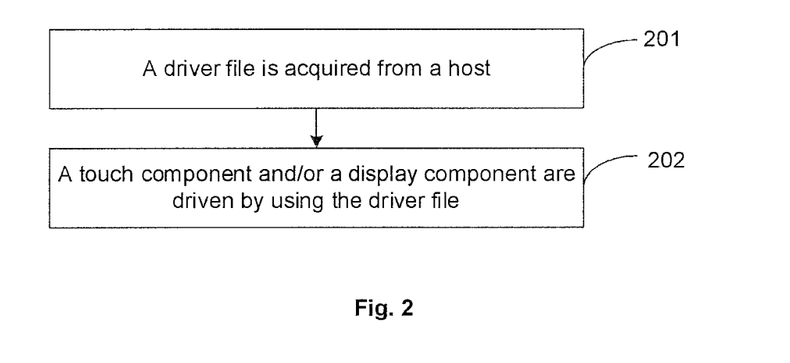
FIG. 2 is an exemplary flowchart of a method for driving a touch and display driver according to an embodiment of the present disclosure.

Correspondingly, as shown in FIG. 2, the method for driving a touch and display driver according to the embodiment of the present disclosure may comprise the following steps.

In step 201, a driver file is acquired from a host.

In step 202, a touch component and/or a display component are driven by using the driver file.

Specifically, the method for driving a touch and display driver shown in FIG. 2 may be performed by, for example, the touch and display driver 10 shown in FIG. 1.

The driver file is stored in the host, and then the driver file is acquired from the host as needed to drive the touch component and/or the display component, which reduces the difficulty in the process of manufacturing the FPC, reduces a manufacturing cost, saves a space of the FPC, and provides conditions for the thinning of the electronic device.

It should be noted that the touch and display driver 10 may acquire driver data such as firmware data, configuration data of the touch component 13 and/or the display component 14 etc. respectively; or may acquire multiple types of driver data such as the firmware data, the configuration data of the touch component 13 and/or the display component 14 etc. at one time, which speeds up the acquisition of the driver file, thereby improving the driving speed and efficiency of the touch and display driver 10.

Correspondingly, the driver file may comprise N data identifiers and N types of driver data corresponding to the N data identifiers respectively, where N is a positive integer greater than or equal to 1.

The controller 12 is specifically configured to determine N target driver devices according to the N data identifiers; and drive the N target driver devices by using the N types of driver data, respectively.

Here, the driver data may comprise data such as the firmware data, the configuration data of the touch component 13, the configuration data of the display component 14, power driver data of the display component 14, time driver data, etc.

The data identifiers are used to uniquely identify the driver data, and may be arbitrarily set as needed. For example, the data identifiers may be customized fields such as Data1, Data2, etc.

The target driver devices may be the touch component 13 or the display component 14.

It should be noted that, since there is a correspondence relationship between the driver data and the devices to be driven, and the data identifiers are used to uniquely identify the driver data, the target driver devices corresponding to the driver data may be determined according to the data identifiers.

Specifically, after the touch and display driver 10 acquires the driver file comprising multiple types of driver data from the host through the communication interface 11 at one time, the controller 12 may determine N target drivers corresponding to N data identifiers in the driver file, respectively, according to the N data identifiers, to drive the N target driver devices respectively by using N types of driver data corresponding to the N data identifiers, respectively.

For example, it is assumed that a data identifier corresponding to the configuration data of the touch component 13 is preset to Data1, and a data identifier corresponding to the configuration data of the display component 14 is preset to Data2. If the driver file acquired by the touch and display driver 10 from the host comprises the data identifiers Data1 and Data2, it may be determined that target driver devices are the touch component 13 and the display component 14 according to the data identifiers Data1 and Data2, so that the touch component 13 and the display component 14 may be driven by using the configuration data of the touch component 13 corresponding to Data1 and the configuration data of the display component 14 corresponding to Data2 respectively.

Correspondingly, in the method for driving a touch and display driver shown in FIG. 2, step 202 may comprise:

determining N target driver devices according to N data identifiers;

driving the N target driver devices by using N types of driver data, respectively.

It should be noted that when the touch and display driver 10 acquires the driver data from the host, multiple types of driver data may be transmitted in a preset order. For example, firmware data may be transmitted firstly, and then configuration data may be transmitted. However, the present disclosure is not limited thereto.

The driving speed and efficiency of the touch and display driver 10 are improved by acquiring the multiple types of driver data at one time. Further, the target driver devices are determined according to the data identifiers, which speeds up the determination of the target driver devices by the touch and display driver 10.

In addition, in the embodiment of the present disclosure, after the touch and display driver 10 is powered on, the driver file may be automatically acquired from the host; or the touch and display driver 10 may firstly transmit a driver file acquisition request to the host, and after the host receives the driver file acquisition request, the driver file is acquired from the host. That is, in the touch and display driver 10 according to the embodiment of the present disclosure, the controller 12 may further be configured to:

transmit a driver file acquisition request to the host through the communication interface 11, wherein the acquisition request comprises identifiers of target driver data.

Here, the identifiers of the target driver data are used to uniquely identify the target driver data, and may be arbitrarily set as needed. For example, the identifiers may be customized fields such as Data1, Data2, etc. In an embodiment of the present disclosure, the acquisition request may comprise identifiers of N types of target driver data, where N is a positive integer greater than or equal to 1.

Specifically, after the touch and display driver 10 is powered on, when N devices need to be driven, the touch and display driver 10 may transmit a driver file acquisition request to the host, where the acquisition request comprises identifiers of N types of target driver data for driving the N devices respectively. After the N types of target driver data are acquired by the touch and display driver 10, N target driver devices may be determined according to the N identifiers, so as to drive the N target driver devices by using the N types of driver data, respectively. The touch and display driver 10 firstly transmits a driver file acquisition request to the host, and then acquires the driver file, thereby improving the flexibility of the control of the touch and display driver 10.

Correspondingly, before step 201, the method for driving a touch and display driver according to the embodiment of the present disclosure may further comprise:

transmitting a driver file acquisition request to the host, wherein the acquisition request comprises identifiers of target driver data.

In a possible implementation of the present disclosure, the driver file may comprise a file header, which may comprise a size of the driver file, so that when the touch and display driver 10 receives the driver file, it may be determined, according to the size of the driver file, whether a process of receiving the file by the touch and display drive 10 ends. In addition, the file header may comprise a first check code, so that it may be determined whether the received driver file is accurate according to the first check code.

That is, the driver file comprises a file header, which comprises a size of the driver file and a first check code.

The controller 12 is further configured to, after the driver file is acquired, determine whether the process of receiving the driver file ends according to the size of the driver file in the file header; and calculate first check data according to the acquired driver file; and determine whether the acquired driver file is accurate according to whether the first check code is consistent with the first check data.

It can be understood that, in addition to the file header, the driver file may further comprise a data block. The first check code may be determined by the host according to an attribute of the file header and the data block in the driver file, and is used by the touch and display driver 10 to determine whether the acquired driver file is accurate. The first check code may be a redundancy check code or another check code, which is not limited here.

The first check data may be a check code etc. which is calculated by the controller 12 according to the acquired driver file.

Specifically, after the touch and display driver 10 acquires the driver file from the host through the communication interface 11, if a size of the driver file is the same as the size of the driver file included in the file header, it may be determined that the process of receiving the driver file ends.

In addition, after the touch and display driver 10 acquires the driver file and calculates the first check data according to the driver file, the first check code may be compared with the first check data, and if the calculated first check data is consistent with the first check code included in the file header, it may be determined that the acquired driver file is accurate, and if the first check data is inconsistent with the first check code included in the file header, it may be determined that the acquired driver file is inaccurate.

Figure 4A:
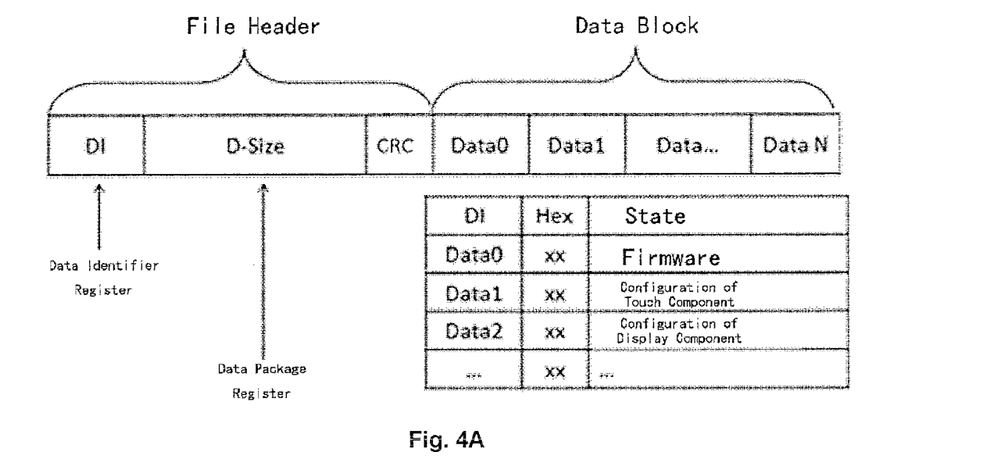
FIGS. 4A-4B are exemplary structural diagrams of a driver file according to an embodiment of the present disclosure.

In a specific implementation, the driver file may be a Hex file, and the driver file may have a structure as shown in FIG. 4A, in which the file header comprises a state DI of the transmitted data, a size D-Size of the driver file, and a first check code CRC. Here, the state may be used to indicate a type of the data. A specific data state may be indicated by Data0, Data1, etc. Here, in some embodiments, Data0 may indicate that the corresponding data is the firmware data, Data1 may indicate that the corresponding data is the configuration data of the touch component, Data2 may indicate that the corresponding data is the configuration data of the display component, etc. However, the present disclosure is not limited thereto.

Here, the state DI of the transmitted data and D-Size may be set and transmitted by using a data identifier register and a data package register, respectively. Here, the data identifier register may set different values to indicate data in different states, such as the firmware data, the configuration data of the touch component, and the configuration data of the display component. The data package register may set and transmit data size information for a specific data state of the data identifier register.

Specifically, the data block may be transmitted sequentially according to actual data of the specific state information identified in the file header until the driver file has data of the size D-Size. If the touch and display driver 10 determines that a size of the received driver file is the same as the size D-Size, it may be determined that the process of receiving the driver file ends. At the same time, the touch and display driver 10 may calculate first check data according to the driver file, and if the first check data calculated according to the driver file is consistent with the first check code CRC, it may be determined that the acquired driver file is accurate.

Figure 4B:
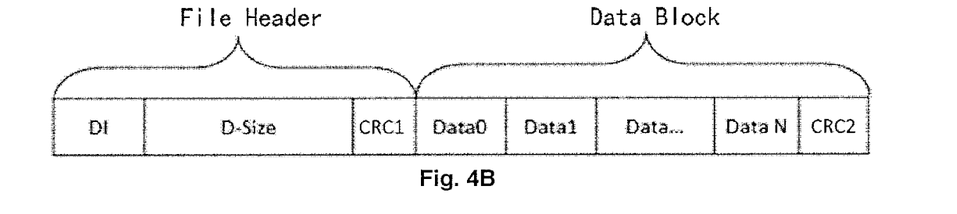

Further, the host may also determine a first check code and a second check code according to the attribute of the file header and the data block in the driver file respectively. That is, as shown in FIG. 4B, in the driver file acquired by the touch and display driver 10, a first check code CRC1 may be included in the file header, and a second check code CRC2 may be included in the data block. The first check code CRC1 is used by the touch and display driver 10 to determine whether the file header in the acquired driver file is accurate, and the second check code CRC2 is used by the touch and display driver 10 to determine whether the data block in the acquired driver file is accurate. Thereby, after the touch and display driver 10 acquires the driver file, first check data and second check data may be calculated according to the file header and the data block respectively, and it is determined whether the first check data calculated according to the file header is consistent with the first check code CRC1 included in the file header, and it is determined whether the second check data calculated according to the data block is consistent with the second check code CRC2 included in the data block. If both of the first check data and the second check data are consistent with the first check code CRC1 and the second check code CRC2 respectively, it may be determined that the acquired driver file is accurate.

Correspondingly, after step 201, the method for driving a touch and display driver according to the embodiment of the present disclosure may further comprise:

determining whether the process of receiving the driver file ends according to the size of the driver file in the file header;

calculating first check data according to the acquired driver file; and determining whether the acquired driver file is accurate according to whether the first check code is consistent with the first check data.

Figure 3:
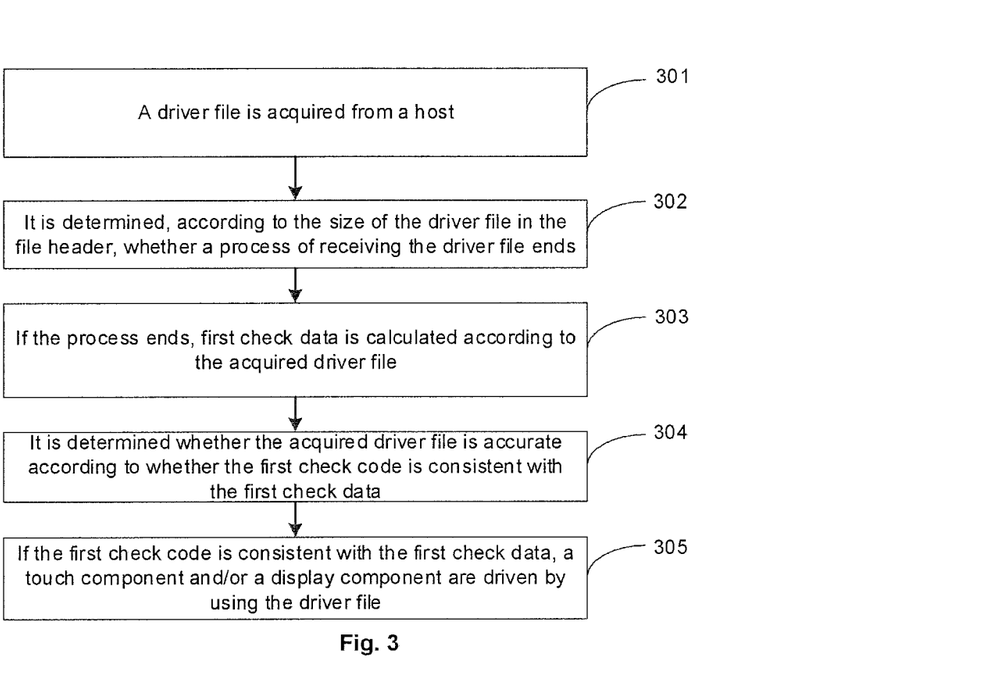
FIG. 3 is an exemplary flowchart of another method for driving a touch and display driver according to an embodiment of the present disclosure.

That is, as shown in FIG. 3, the method for driving a touch and display driver according to the embodiment of the present disclosure may comprise the following steps.

In step 301, a driver file is acquired from a host.

Here, the driver file comprises a file header, which comprises a size of the driver file and a first check code.

In step 302, it is determined, according to the size of the driver file in the file header, whether a process of receiving the driver file ends.

In step 303, if the process ends, first check data is calculated according to the acquired driver file.

In step 304, it is determined whether the acquired driver file is accurate according to whether the first check code is consistent with the first check data.

In step 305, if the first check code is consistent with the first check data, a touch component and/or a display component are driven by using the driver file.

The file header comprising the size of the driver file and the first check code is set in the driver file, which ensures the integrity and reliability of receiving the driver file.

The touch and display driver and the host according to the embodiments of the present disclosure may be communicatively connected to each other through the communication interface, to store the driver file in the host, and then acquire the driver file from the host as needed to drive the touch component and/or the display component in the touch and display driver, which reduces the difficulty in the process of manufacturing the FPC, reduces a manufacturing cost, saves a space of the FPC, and provides conditions for the thinning of the electronic device.

A host and a method for driving a touch and display driver performed on the host side according to the embodiments of the present disclosure will be described below with reference to FIGS. 5, 6, and 7.

Figure 5:
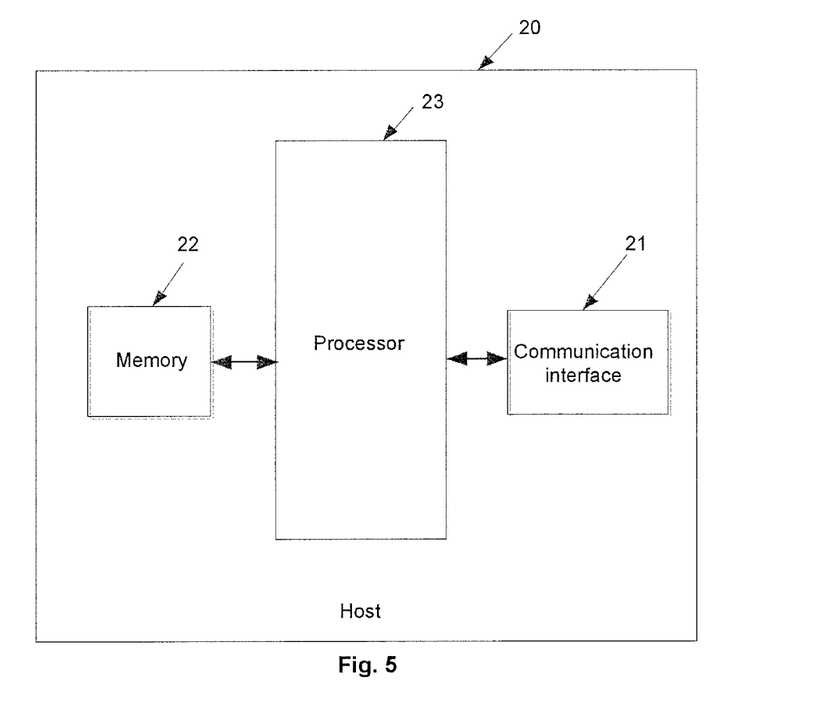
FIG. 5 is an exemplary structural diagram of a host according to an embodiment of the present disclosure.

FIG. 5 is an exemplary structural diagram of a host according to an embodiment of the present disclosure. FIG. 6 is an exemplary flowchart of another method for driving a touch and display driver according to an embodiment of the present disclosure. FIG. 7 is an exemplary flowchart of another method for driving a touch and display driver according to an embodiment of the present disclosure.

As shown in FIG. 5, the host 20 comprises a communication interface 21, a memory 22, and a processor 23.

Specifically, a driver file for driving the touch and display driver 10 is stored in the memory 22.

Specifically, the communication interface 21 is configured to be communicatively connected to the touch and display driver 10.

The processor 23 is configured to, upon determining that the touch and display driver is powered on, read the driver file stored in the memory 22 and transmit the driver file to the touch and display driver 10 through the communication interface 21.

Here, the host 20 may be a device such as a central processor included in an electronic device such as a smart phone, a computer etc. The driver file may comprise driver data such as the firmware data, the configuration data of the touch component 13 and/or the display component 14, the power driver data of the display component 14, the time driver data, etc.

The communication interface 21 of the host 20 may be connected to the touch and display driver 10 through a bus, or may be connected to the touch and display driver 10 by other means, which is not limited here.

Specifically, the driver file required to drive the touch component 13 and/or the display component 14 may be stored in the host 20, so that after the touch and display driver 10 is powered on, when the touch component 13 and/or the display component 14 need to be driven, the processor 23 of the host 20 may read the driver file stored in the memory 22 and transmit the driver file to the touch and display driver 10 through the communication interface 21. Thereby, the touch and display driver 10 may drive the touch component 13 and/or the display component 14 by using the driver file. Since the driver file is stored in the host 20, there is no need to add a Flash to the FPC to store the driver file. As a result, processes of performing piece positioning and burning firmware of the TDDI etc. on the FPC are not required, which reduces the difficulty in the process of manufacturing the FPC, reduces a manufacturing cost, saves a space of the FPC, and provides conditions for the thinning of the electronic device.

Figure 6:
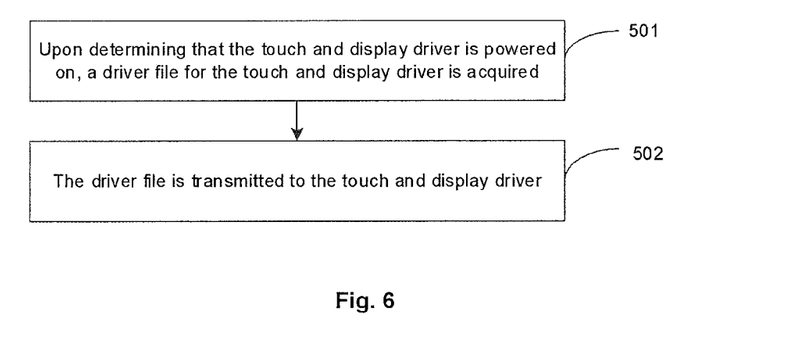
FIG. 6 is an exemplary flowchart of another method for driving a touch and display driver according to an embodiment of the present disclosure.

Correspondingly, as shown in FIG. 6, the method for driving a touch and display driver according to the embodiment of the present disclosure may comprise the following steps.

In step 501, upon determining that the touch and display driver is powered on, a driver file for the touch and display driver is acquired.

In step 502, the driver file is transmitted to the touch and display driver.

Specifically, the method for driving a touch and display driver shown in FIG. 6 may be performed by, for example, the host 20 shown in FIG. 5.

The driver file is stored in the host, and the driver file is transmitted to the touch and display driver when the touch and display driver is powered on to drive the touch component and/or the display component, which reduces the difficulty in the process of manufacturing the FPC, reduces a manufacturing cost, saves a space of the FPC, and provides conditions for the thinning of the electronic device.

It should be noted that the host 20 may transmit the driver data such as the firmware data, the configuration data of the touch component 13 and/or the display component 14 etc. to the touch and display driver 10 respectively; or the host 20 may transmit multiple types of driver data such as the firmware data, the configuration data of the touch component 13 and/or the display component 14 etc. to the touch and display driver 10 at one time, which speeds up the transmission of the driver file, thereby improving the driving speed and efficiency of the touch and display driver 10.

In a specific implementation, the host 20 may determine whether the touch and display driver 10 is powered on in various manners.

For example, it may be monitored whether a power source connected to a power supply terminal of the touch and display driver 10 outputs an electrical signal, and if the power source outputs an electrical signal, it may be determined that the touch and display driver 10 is powered on.

Alternatively, since the touch component 13 and/or the display component 14 need to be driven after the touch and display driver 10 is powered on, a driver file acquisition request may be transmitted to the host 20. Thereby, the host 20 may determine that the touch and display driver 10 is powered on after the host 20 acquires the driver file acquisition request transmitted by the touch and display driver 10.

That is, in step 501, determining that the touch and display driver 10 is powered on may comprise:

determining that a power source connected to a power supply terminal of the touch and display driver outputs an electrical signal;

or, acquiring a driver file acquisition request transmitted by the touch and display driver.

Here, the driver file acquisition request comprises identifiers of target driver data.

The identifiers of the target driver data are used to uniquely identify the target driver data required to drive target driver devices, and may be arbitrarily set as needed. For example, the identifiers may be customized fields such as Data1, Data2, etc. In an embodiment of the present disclosure, identifiers of N types of target driver data may be included in the acquisition request, where N is a positive integer greater than or equal to 1.

Correspondingly, the host 20 may automatically transmit the driver file to the touch and display driver 10 after it is monitored that the touch and display driver 10 is powered on; or the host 20 may transmit the driver file to the touch and display driver 10 after receiving a driver file acquisition request transmitted by the touch and display driver 10. That is, the communication interface 21 is further configured to acquire a driver file acquisition request transmitted by the touch and display driver 10, wherein the acquisition request comprises identifiers of the target driver data.

Specifically, after the touch and display driver 10 is powered on, when N devices need to be driven, the touch and display driver 10 may transmit a driver file acquisition request to the host 20, wherein the acquisition request comprises identifiers of N types of target driver data for driving the N devices respectively. Thereby, after acquiring the driver file acquisition request, the host 20 may read the corresponding N types of target driver data stored in the memory 22 according to the identifiers of the N types of target driver data, and transmit the corresponding N types of target driver data to the touch and display driver 10. In this way, after acquiring the N types of target driver data, the touch and display driver 10 may drive the N target driver devices. The driver file is transmitted to the touch and display driver 10 according to the driver file acquisition request transmitted by the touch and display driver 10, which improves flexibility of the transmission of the driver file.

In a possible implementation of the present disclosure, the driver file transmitted by the host 20 may be a file which is packaged according to a protocol corresponding to the communication interface, that is, the processor 23 is further configured to package the driver file according to the protocol corresponding to the communication interface. Correspondingly, as shown in FIG. 7, before step 502, the method may further comprise step 601 of packaging the driver file according to a communication interface protocol for communicative connection with the touch and display driver 10.

Here, the protocol corresponding to the communication interface may be set as needed.

Specifically, the driver file may comprise a file header, which may comprise a size field for identifying a size of the driver file and a check code field, so that after the host 20 transmits the driver file to the touch and display driver 10, the touch and display driver 10 may determine whether the process of receiving the file by the touch and display driver 10 ends according to size information of the size field, and determine whether the received driver file is accurate by using a check code of the check code field.

That is, the processor 23 is further configured to determine a file header corresponding to the driver file according to an attribute of the driver file, wherein the file header comprises a size field for identifying a size of the driver file and a check code field.

Figure 7:
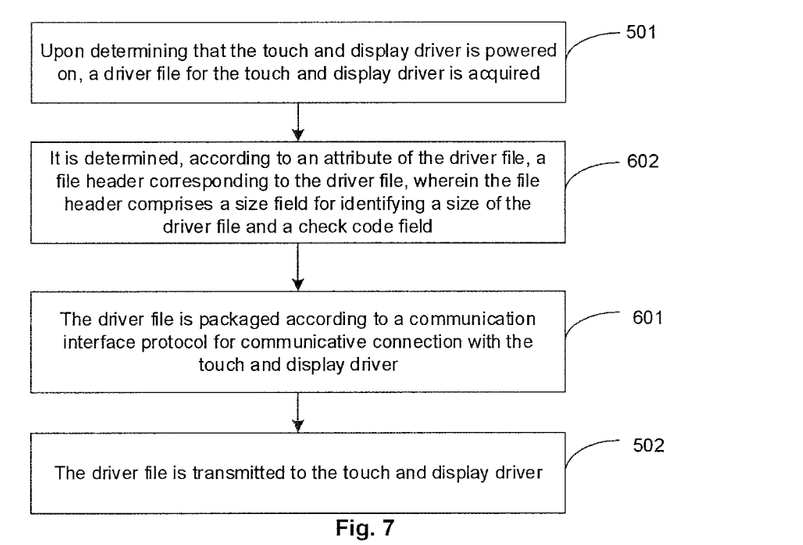
FIG. 7 is an exemplary flowchart of another method for driving a touch and display driver according to an embodiment of the present disclosure.

Correspondingly, as shown in FIG. 7, before step 601, the method may further comprise the following step.

In step 602, it is determined, according to an attribute of the driver file, a file header corresponding to the driver file, wherein the file header comprises a size field for identifying a size of the driver file and a check code field.

Here, the attribute of the driver file may comprise any information related to the driver file, such as the size of the driver file, a type of the driver data, etc.

The size field for identifying the size of the driver file and the check code field are set in the driver file, which ensures integrity and reliability of the transmission of the driver file.

The host according to the embodiments of the present disclosure may be communicatively connected to the touch and display driver through the communication interface, to store the driver file in the host, and then transmit the driver file to the touch and display driver as needed to drive the touch component and/or the display component in the touch and display driver, which reduces the difficulty in the process of manufacturing the FPC, reduces a manufacturing cost, saves a space of the FPC, and provides conditions for the thinning of the electronic device.

The method for driving a touch and display driver according to the embodiment of the present disclosure will be further described below with reference to FIG. 8.

Figure 8:
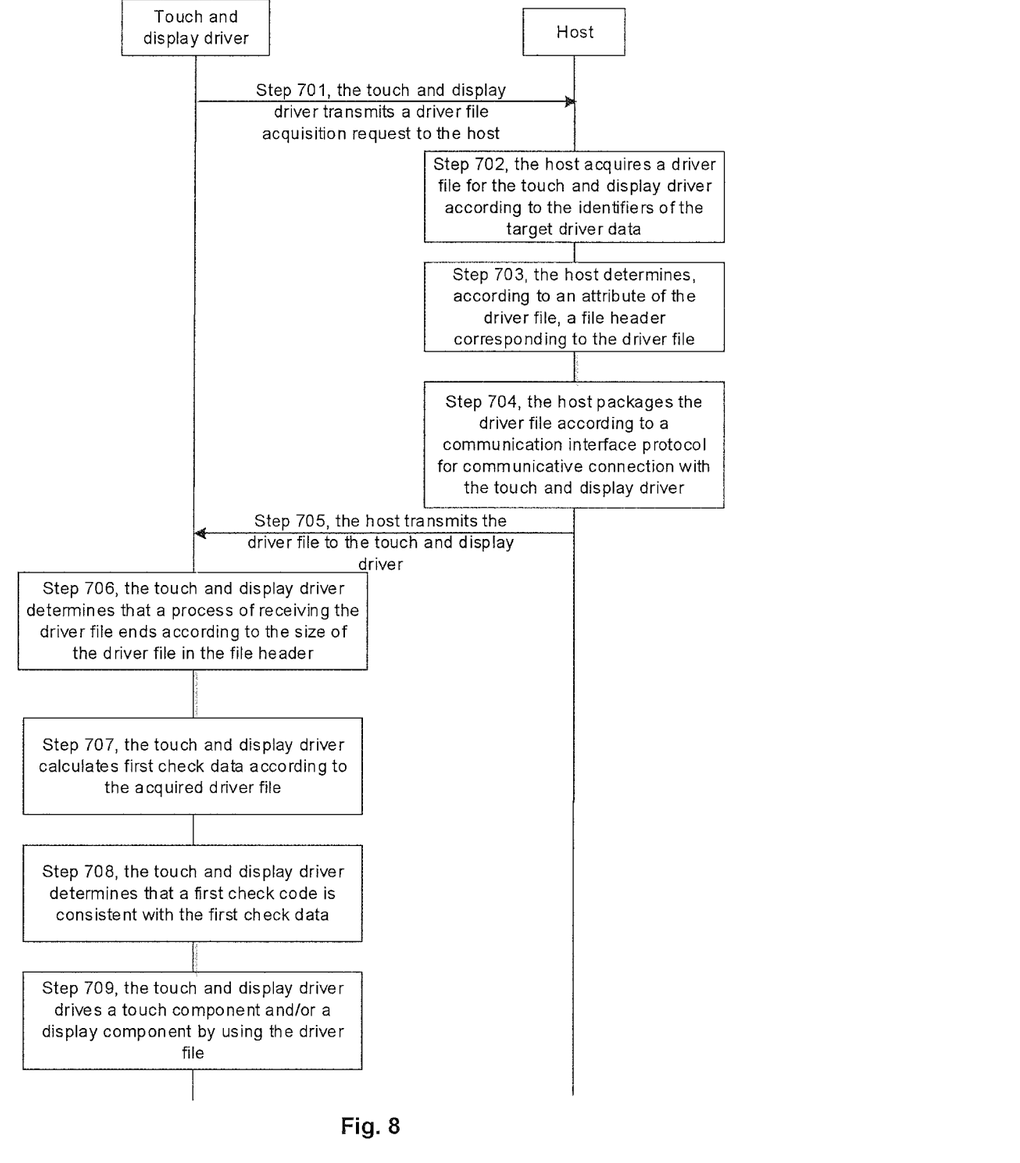
FIG. 8 is an exemplary diagram of signaling interaction of a method for driving a touch and display driver according to an embodiment of the present disclosure.

FIG. 8 is an exemplary diagram of signaling interaction of a method for driving a touch and display driver according to an embodiment of the present disclosure.

As shown in FIG. 8, the method for driving a touch and display driver is performed by the touch and display driver and a host, and a specific interaction process is as follows.

In step 701, the touch and display driver transmits a driver file acquisition request to the host.

Here, the acquisition request comprises identifiers of target driver data.

In step 702, the host acquires a driver file for the touch and display driver according to the identifiers of the target driver data.

In step 703, the host determines, according to an attribute of the driver file, a file header corresponding to the driver file.

Here, the file header comprises a size field for identifying a size of the driver file and a check code field.

In step 704, the host packages the driver file according to a communication interface protocol for communicative connection with the touch and display driver.

In step 705, the host transmits the driver file to the touch and display driver.

In step 706, the touch and display driver determines that a process of receiving the driver file ends according to the size of the driver file in the file header.

In step 707, the touch and display driver calculates first check data according to the acquired driver file.

In step 708, the touch and display driver determines that a first check code is consistent with the first check data.

In step 709, the touch and display driver drives a touch component and/or a display component by using the driver file.

Through the above process of interaction between the touch and display driver and the host, when the touch component and/or the display component in the touch and display driver are to be driven, the host may transmit the driver file stored therein to the touch and display driver, to drive the touch component and/or the display component in the touch and display driver, which reduces the difficulty in the process of manufacturing the FPC, reduces a manufacturing cost, saves a space of the FPC, and provides conditions for the thinning of the electronic device.

The embodiments of the present disclosure further provide a touch display apparatus.

Figure 9:
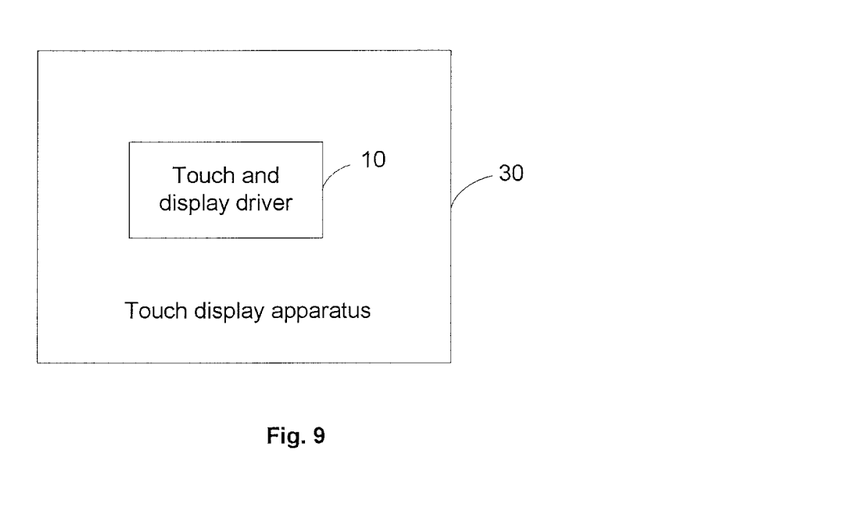
FIG. 9 is an exemplary structural diagram of a touch display apparatus according to an embodiment of the present disclosure.

FIG. 9 is an exemplary structural diagram of a touch display apparatus according to an embodiment of the present disclosure.

As shown in FIG. 9, the touch display apparatus 30 comprises the touch and display driver 10.

The touch display apparatus according to the embodiments of the present disclosure stores the driver file in the host, and then acquires the driver file from the host as needed to drive the touch component and/or the display component in the touch and display driver, which reduces the difficulty in the process of manufacturing the FPC, reduces a manufacturing cost, saves a space of the FPC, and provides conditions for the thinning of the electronic device.

The embodiments of the present disclosure further provide an electronic device.

Figure 10:
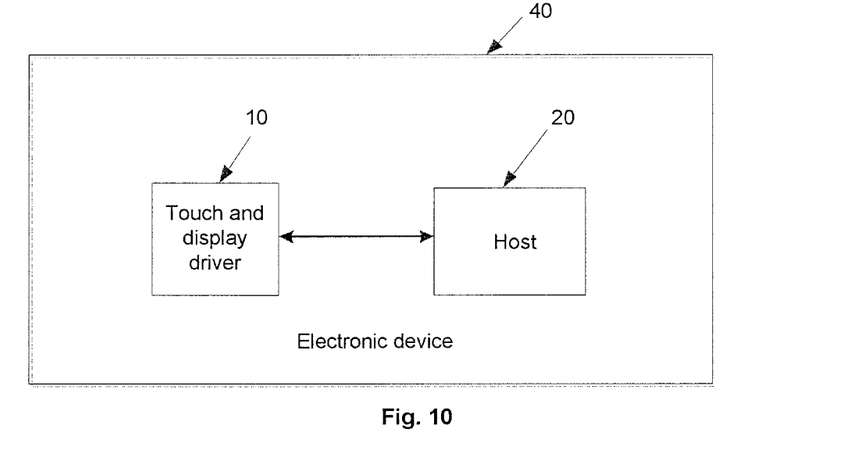
FIG. 10 is an exemplary structural diagram of an electronic device according to an embodiment of the present disclosure.

FIG. 10 is an exemplary structural diagram of an electronic device according to an embodiment of the present disclosure.

As shown in FIG. 10, the electronic device 40 comprises the touch and display driver 10 and the host 20.

It can be understood that the electronic device 40 may further comprise a flexible circuit board, and the touch and display driver 10 and the host 20 may be disposed on the flexible circuit board as needed. Since the driver file is stored in the host 20, there is no need to add a Flash to the flexible circuit board to store the driver file, which reduces the difficulty in the process of manufacturing the FPC, reduces a manufacturing cost, saves a space of the FPC, and provides conditions for the thinning of the electronic device.

It should be noted that the specific description of the embodiments of the touch and display driver 10 and the host 20 is also applicable to the electronic device 40 according to the embodiment of the present disclosure, and details thereof will not be described here again.

In the electronic device according to the embodiment of the present disclosure, the touch and display driver may be communicatively connected to the host through the communication interface, to store the driver file in the host, and acquire the driver file from the host as needed to drive the touch component and/or the display component in the touch and display driver, which reduces the difficulty in the process of manufacturing the FPC, reduces a manufacturing cost, saves a space of the FPC, and provides conditions for the thinning of the electronic device.

In the description of the present specification, the description referring to the terms "one embodiment", "some embodiments", "an example", "a specific example", or "some examples" etc. means that a specific feature, structure, material or characteristics described in conjunction with the embodiment or example is included in at least one embodiment or example of the present disclosure. In the present specification, schematic expressions of the above terms do not necessarily have to refer to the same embodiment or example. Furthermore, the specific feature, structure, material, or characteristics described may be combined in any suitable manner in any one or more embodiments or examples. In addition, those skilled in the art can combine and merge different embodiments or examples described in the present specification and features in different embodiments or examples without conflicting with each other.

Furthermore, the terms "first" and "second" are used for descriptive purposes only, and are not to be construed as indicating or implying relative importance or implicitly indicating a number of indicated technical features. Thus, features defined by "first" and "second" may explicitly or implicitly include at least one of the features. In the description of the present disclosure, "plurality" means at least two, such as two, three, etc., unless explicitly and specifically defined otherwise.

Any process or method described in the flowcharts or described elsewhere herein may be construed as meaning modules, sections, or portions including codes of executable instructions of one or more steps for implementing a custom logic function or process. Further, the scope of the preferred implementations of the present disclosure includes additional implementations in which functions may be performed in a substantially simultaneous manner or in a reverse order, depending on the functions involved, instead of the order shown or discussed, which should be understood by those skilled in the art to which the embodiments of the present disclosure pertain.

A logic and/or steps represented in the flowcharts or otherwise described herein, for example, may be considered as a sequence listing of executable instructions for implementing logical functions, and may be embodied in any computer-readable medium for use by an instruction execution system, apparatus or device (for example, a computer-based system, a system including a processor or other systems which may obtain instructions from the instruction execution system, apparatus or device and may execute the instructions), or may be used in combination with the instruction execution system, apparatus or device. As for this specification, a "computer-readable medium" may be any means which may contain, store, communicate, propagate, or transmit programs for use by or in connection with the instruction execution system, apparatus, or device. More specific examples (non-exhaustive listings) of the computer-readable media include an electrical connection part (an electronic apparatus) having one or more wirings, a portable computer disk cartridge (a magnetic apparatus), a Random Access Memory (RAM), a Read Only Memory (ROM), an Erasable and Programmable Read Only Memory (an EPROM) or a flash memory, a fiber optic apparatus, and a portable Compact Disc-Read Only Memory (CD-ROM). In addition, the computer-readable media may even be paper or other suitable medium on which the programs may be printed, as the programs may be obtained electronically by optically scanning the paper or the other medium and then editing, interpreting, or performing other suitable processing (if necessary) on the paper or the other medium, and then the programs are stored in a computer memory.

It should be understood that portions of the present disclosure may be implemented in hardware, software, firmware, or a combination thereof. In the above embodiments, a plurality of steps or methods may be implemented by using software or firmware stored in a memory and executed by a suitable instruction execution system. For example, if implemented in hardware, as in another embodiment, it can be implemented by using any one or a combination of the following techniques known in the art: discrete logic gates having logic gate circuits for implementing logic functions on data signals, an application-specific integrated circuit having a suitable combinational logic gate circuit, a Programmable Gate Array (PGA), a Field Programmable Gate Array (FPGA), etc.

It can be understood by those of ordinary skill in the art that all or a part of steps carried in the method according to the embodiments may be completed by programs instructing a related hardware. The programs may be stored in a computer-readable storage medium. When executed, the programs include one or a combination of the steps of the method embodiments.

In addition, various functional units in various embodiments of the present disclosure may be integrated in one processing module, or may exist alone physically, or two or more units may be integrated in one module. The integrated module may be implemented in a form of hardware or in a form of a software functional module. The integrated module may also be stored in a computer readable storage medium if it is implemented in a form of a software functional module and sold or used as an independent product.

The above-mentioned storage medium may be a read only memory, a magnetic disk or an optical disk etc. Although the embodiments of the present disclosure have been noted and described above, it can be understood that the above embodiments are exemplary and are not to be construed as limiting the scope of the disclosure. Changes, modifications, substitutions and variations can be made to the above embodiments by those of ordinary skill in the art within the scope of the present disclosure.

I claim:

1. A touch and display driver, comprising:
   a communication interface configured to be communicatively connected to a host to acquire a driver file; and
   a controller configured to drive a touch component and/or a display component by using the acquired driver file,
   wherein the driver file comprises N data identifiers and N types of driver data corresponding to the N data identifiers, respectively, wherein N is a positive integer greater than or equal to 1,
   the controller is further configured to determine N target driver devices according to the N data identifiers, and drive the N target driver devices by using the N types of driver data, respectively; and
   wherein the controller is further configures to transmit a driver file acquisition request to the host through the communication interface, wherein the driver file acquisition request comprises identifiers of target driver data.

2. The touch and display driver according to claim 1, further comprising the touch component and/or the display component.

3. The touch and display driver according to claim 1, wherein the driver file comprises a file header, which comprises a size of the driver file; and
   the controller is further configured to, after acquiring the driver file, determine, according to the size of the driver file in the file header, whether a process of receiving the driver file ends.

4. A touch display apparatus, comprising the touch and display driver according to claim 1.

5. A method for driving the touch and display driver according to claim 1, the method comprising:
   acquiring the driver file from the host; and
   driving the touch component and/or the display component by using the driver file,
   wherein the driver file comprises N data identifiers and N types of driver data corresponding to the N data identifiers, respectively, wherein N is positive integer greater than or equal to 1; and
   the step of driving a touch component and/or a display component comprises;
      determining N target driver devices according to the N data identifiers; and
      driving the N target driver devices by using the N types of driver data respectively, and
   wherein before acquiring the driver file from the host, the method further comprises;
   transmitting a driver file acquisition request to the host, wherein the driver file acquisition request comprises identifiers of target driver data.

6. The method according to claim 5, wherein the driver file comprises a file header, which comprises a size of the driver file; and
   after the host acquires the driver file, the method further comprises:
   determining whether a process of receiving the driver file ends according to the size of the driver file in the file header.

7. The method according to claim 5, wherein the driver file comprises a file header, which comprises a first check code of the driver file; and
   after the host acquires the driver file, the method further comprises:
      calculating first check data according to the acquired driver file; and
      determining whether the acquired driver file is accurate according to whether the first check code is consistent with the first check data.

8. The touch and display driver according to claim 1, wherein the driver file comprises a file header, which comprises a first check code of the driver file; and
   the controller is further configured to calculate first check data according to the acquired driver file; and determine whether the acquired driver file is accurate according to whether the first check code is consistent with the first check data.

9. A host, comprising:
   a memory configured to store a driver file for driving a touch and display driver;
   a communication interface configured to be communicatively connected to the touch and display driver; and a processor configured to, upon determining that the touch and display driver is powered on, read the driver file stored in the memory and transmit the driver file to the touch and display driver through the communication interface, wherein the driver file comprises N data identifiers and N types of driver data corresponding to the N data identifiers, respectively, wherein N is positive integer greater than or equal to 1, and wherein the communication interface is further configured to acquire a driver file acquisition request transmitted by the touch and display driver, wherein the driver file acquisition request comprises identifiers of target driver data.

10. The host according to claim 9, wherein the processor is further configured to package the driver file according to a protocol corresponding to the communication interface; and the processor is further configured to determine a file header corresponding to the driver file according to an attribute of the driver file, wherein the file header comprises a size field for identifying a size of the driver file and a check code field.

11. A method at the host according to claim 9 for driving the touch and display driver, comprising:

upon determining that the touch and display driver is powered on, acquiring the driver file for the touch and display driver; and transmitting the driver file to the touch and display driver, wherein the driver file comprises N data identifiers and N types of driver data corresponding to the N data identifiers, respectively, wherein N is a positive integer greater than or equal to 1, and wherein the step of determining that the touch and display driver is powered on comprises;

acquiring a driver file acquisition request transmitted by the touch and display driver, wherein the driver file acquisition request comprises identifiers of target driver data.

12. The method according to claim 11, wherein before transmitting the driver file to the touch and display driver, the method further comprises:

packaging the driver file according to a communication interface protocol for communicative connection with the touch and display driver.

13. The method according to claim 12, wherein before packaging the driver file, the method further comprises:

determining a file header corresponding to the driver file according to an attribute of the driver file, wherein the driver header comprises a size field for identifying a size of the driver file and a check code field.

14. An electronic device, comprising:

a touch and display driver comprising:

a communication interface configured to be communicatively connected to a host to acquire a driver file; and a controller configured to drive a touch component and/or a display component by using the acquired driver file, wherein the driver file comprises N data identifiers and N types of driver data corresponding to the N data identifiers, respectively, wherein N is a positive integer greater than or equal to 1, the controller is further configured to determine N target driver device according to the N data identifiers, and drive the N target driver devices by using the N types of driver data, respectively; and wherein the controller is further configured to transmit a driver file acquisition request to the host through the communication interface, wherein the driver file acquisition request comprises identifiers of target driver data, a host comprising:

a memory configured to store a driver file for driving a touch and display driver;

a communication interface configured to be communicatively connected to the touch and display driver; and a processor configured to, upon determining that the touch and display driver is powered on, read the driver file stored in the memory and transmit the driver file to the touch and display driver through the communication interface, wherein the communication interface is further configured to acquire the driver file acquisition request transmitted by the touch and display driver.

\* \* \* \* \*